Nov. 15, 1938. E. J. EADDY Re. 20,917

MEANS FOR CLEANING TEXTILE MACHINERY

Original Filed Jan. 16, 1936 5 Sheets-Sheet 1

Inventor:
ERNEST J. EADDY

BY [signature]
Attorney

Nov. 15, 1938. E. J. EADDY Re. 20,917

MEANS FOR CLEANING TEXTILE MACHINERY

Original Filed Jan. 16, 1936 5 Sheets-Sheet 2

INVENTOR:
ERNEST J. EADDY

By Paul Eaton

Attorney

Nov. 15, 1938. E. J. EADDY Re. 20,917

MEANS FOR CLEANING TEXTILE MACHINERY

Original Filed Jan. 16, 1936 5 Sheets-Sheet 3

Inventor:
ERNEST J. EADDY

By

Attorney

Nov. 15, 1938. E. J. EADDY Re. 20,917

MEANS FOR CLEANING TEXTILE MACHINERY

Original Filed Jan. 16, 1936 5 Sheets-Sheet 4

Ernest J. Eaddy
Inventor

By Paul Peter

Attorney

Nov. 15, 1938. E. J. EADDY Re. 20,917
MEANS FOR CLEANING TEXTILE MACHINERY
Original Filed Jan. 16, 1936 5 Sheets-Sheet 5
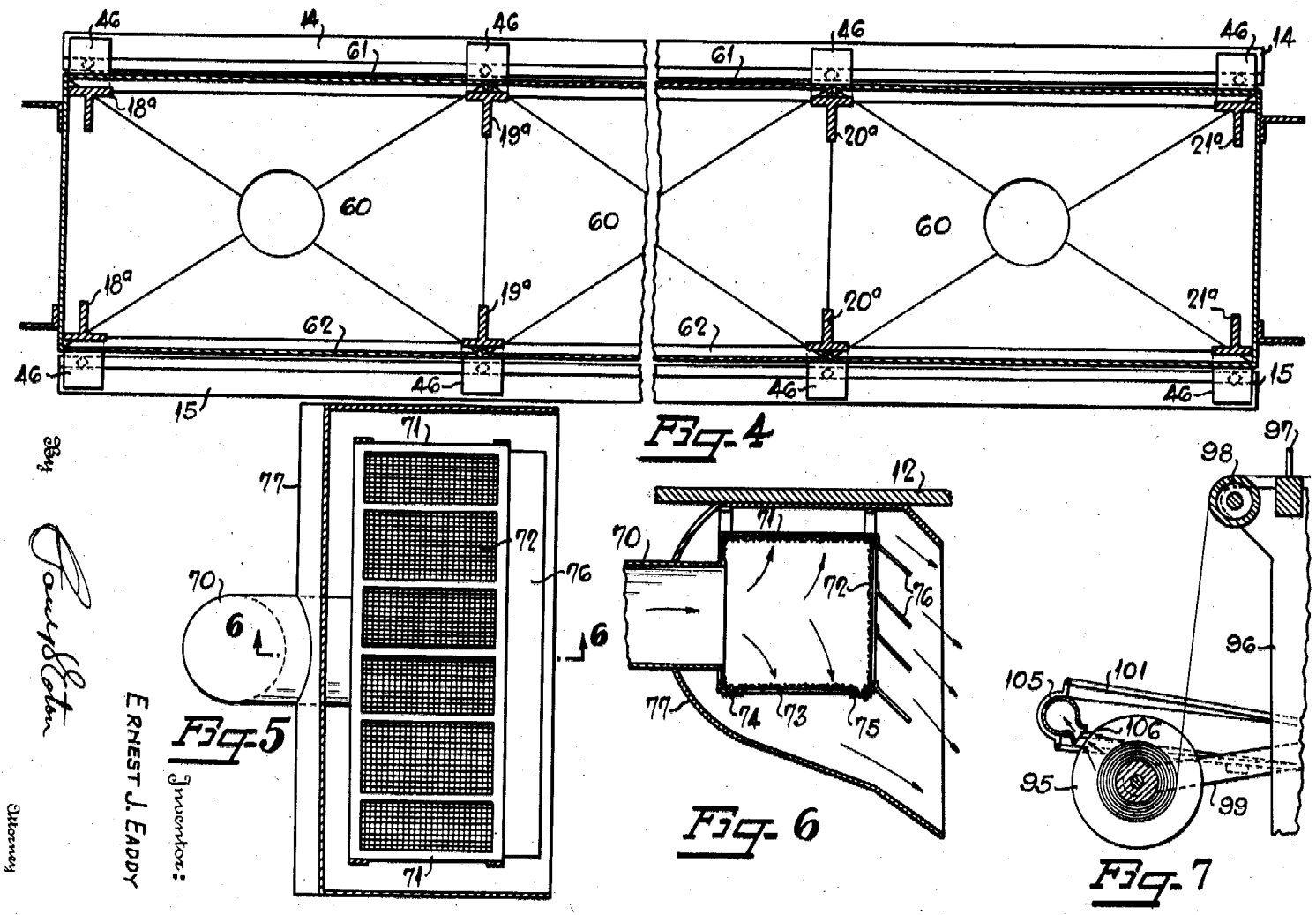
Inventor:
ERNEST J. EADDY
By Paul Eaton
Attorney Reissued Nov. 15, 1938

Re. 20,917

UNITED STATES PATENT OFFICE 20,917

MEANS FOR CLEANING TEXTILE MACHINERY

Ernest J. Eaddy, Spartanburg, S. C.

Original No. 2,057,139, dated October 13, 1936, Serial No. 59,464, January 16, 1936. Application for reissue May 3, 1937, Serial No. 140,572

7 Claims. (Cl. 28—22)

Figure 1:
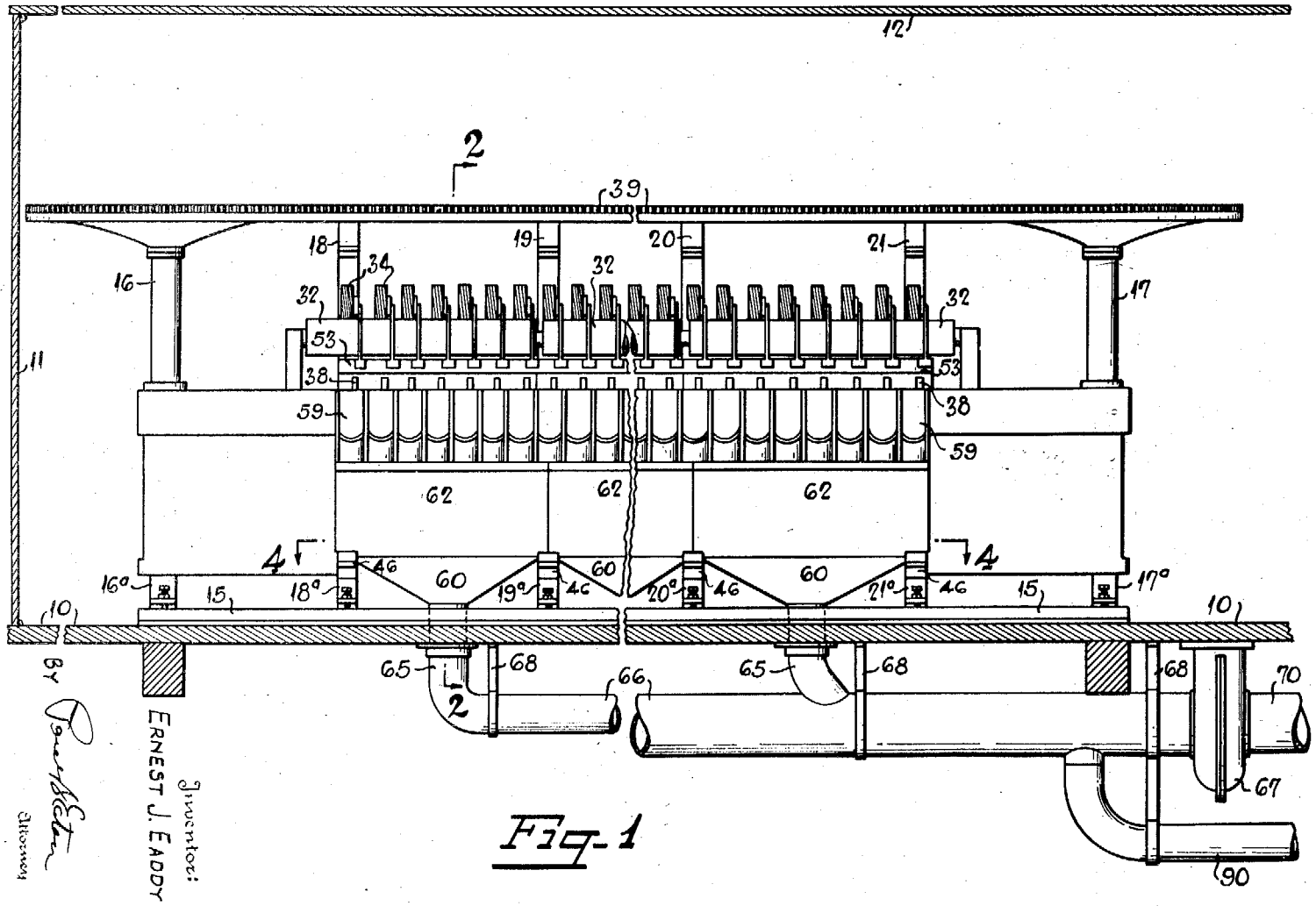

This invention relates to a means for maintaining textile machinery clean of foreign matter which would ordinarily settle therein during operation of the latter, and is designed primarily for use in connection with automatic spoolers and spinning frames, but it is to be understood that a means, in accordance with this invention is for use in any connection for which it may be found applicable, and the invention has for its object to provide a means for the purpose referred to so constructed and so correlated with the machine whereby an induced draft is provided through the normal openings of the machine for preventing undesirable particles, such as dust, lint and fly, generated during the operation of the machine from settling on the latter, and for delivering the same to a collector.

A further object of the invention is to provide a means having the elements thereof so constructed and so correlated with the machine to localize, relative to the latter, induced drafts whereby foreign matter such as dust, lint and fly, generated during the operation of the machine, will be drawn through the normal openings of the machine and discharged from the latter.

It is a well known fact that where a direct draft is produced by fans and directed upon textile machinery for cleaning the same, that this draft merely scatters the lint and other particles and contaminates the air in the room in which the machinery is located. Furthermore, the dust, lint and other particles which are removed from the machinery ultimately settle upon the yarn. These lint particles sometimes produce gouts when settled on the yarn which are objectionable because they reduce the quality of the cloth and hinder production by causing breaking of the yarn in the weaving process.

It is evident that by using an induction draft the air is not contaminated with these particles but instead, the particles are drawn directly into the ducts. This produces a more healthful working condition for the operators and also eliminates the dust and fly from the room which otherwise would materially affect the quality of yarn when it has settled thereon.

It is a further object of this invention to provide a means for cleaning textile machinery which comprises a system of hoppers and ducts connected to a fan for creating an induction draft to clean the textile machinery, and a filtering means disposed on the other side of the fan and having one side thereof connected to the duct which discharges into the same room from whence the air was drawn so that the filtered air is recirculated in the same room. This has a very decided advantage, especially where the temperature or humidity on the outside of the building is different from that on the inside. For example, if the temperature on the inside of the room is 55.2 degrees higher than the temperature on the outside, then for every cubic foot of air drawn from the outside to the inside of the room there would be required one B. t. u. to raise this temperature to normal room temperature. It is seen, therefore, that by filtering this air and recirculating the same, that the temperature of the air is not disturbed materially, therefore, the cost of re-heating this air is negligible. At the same time the humidity of the air in the mill is preserved.

It is a further object of this invention to provide an induction draft for cleaning textile machinery, means for filtering said air, and means for exhausting said air in the same room and directing the exhaust upon a textile machine such as a creel to cause the lint, dust and fly from the same to be blown to suitable induction openings from whence the same is drawn again to the filtering means.

It is still a further object of this invention to provide means for cleaning textile machinery by an induction draft by enclosing portions of the machinery with baffles and with the baffles so arranged as to take advantage of gravity in collecting the fly, lint and dust on, and adjacent the said machinery and also to locate the baffles so that the centrifugal force and air currents caused by the rotation of said machinery may be utilized for assisting in collecting the trash, fly and lint.

A system as shown and described having a 240 spindle capacity would require about 24,000 cubic feet of air per minute to be drawn therethrough in order to produce proper cleaning effects. Therefore, it is seen that if recirculation and filtering were not employed it would require continuously, approximately 450 B. t. u. per minute, to raise room temperature one degree F. above the outside temperature, while a difference of 30 degrees F. in outside and inside temperatures would require about one pound of coal per minute.

Figure 1A:
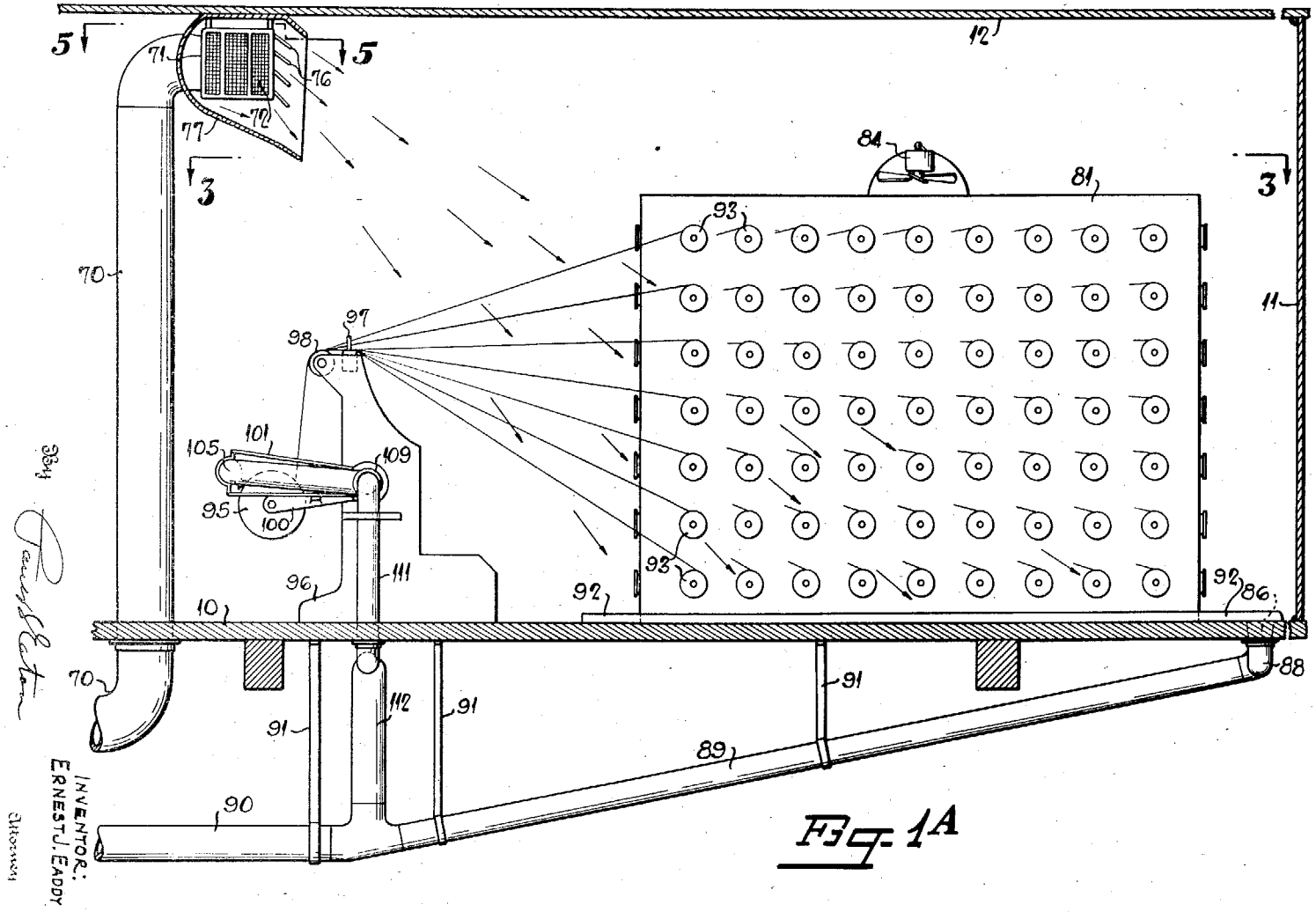
Figure 2:
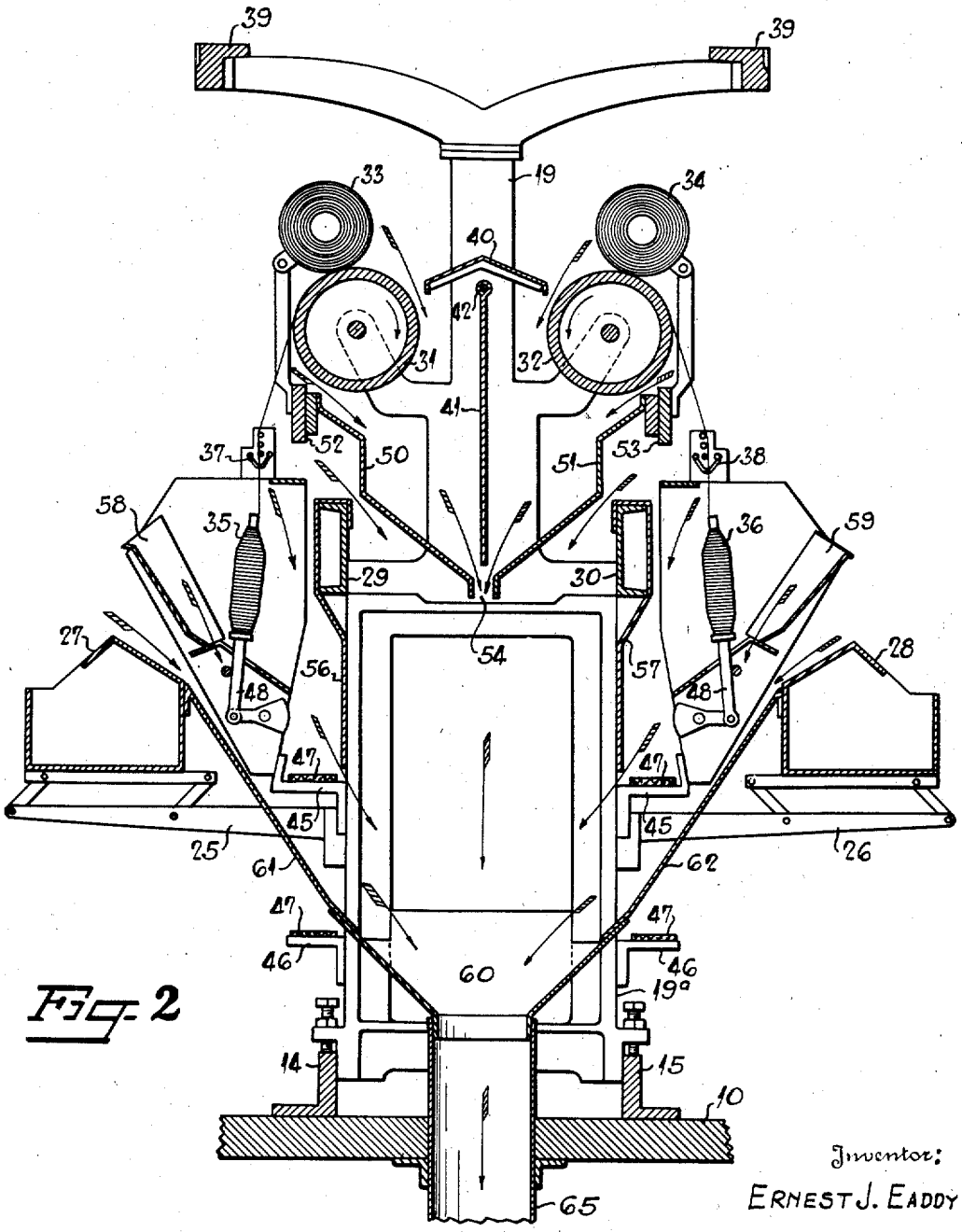
Figure 3:
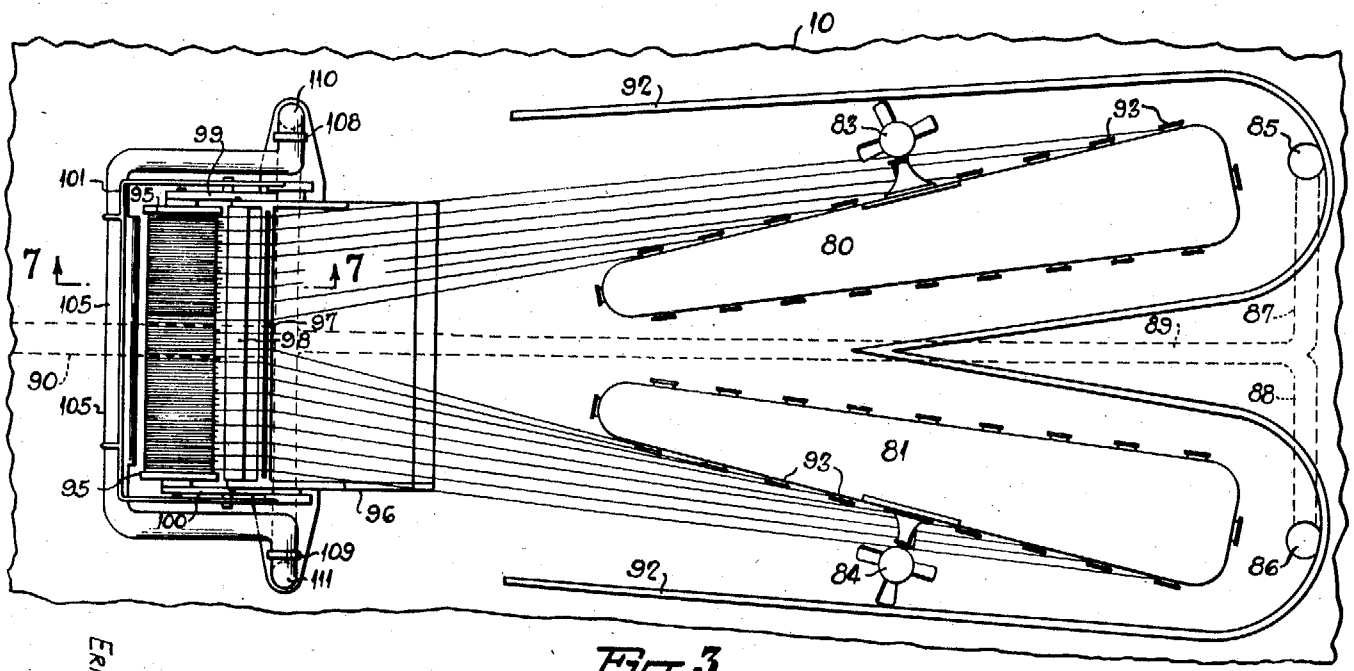

Some of the objects of the invention having been stated, other objects will appear as the description proceeds when taken in connection with the accompanying drawings, in which:

Figure 1 is a vertical sectional view taken through a portion of a room showing an automatic spooler in elevation with the invention applied thereto, Figure 1A is a vertical sectional view taken through the other portion of the room showing in elevation the filtering means, the creel and warper, Figure 2 is a transverse vertical sectional view taken through the automatic spooler along line 2—2 in Figure 1 and showing the bobbin supply boxes located on each side thereof, Figure 3 is a plan view taken along line 3—3 in Figure 1A, Figure 4 is a sectional plan view taken along line 4—4 in Figure 1, Figure 5 is a sectional plan view taken along line 5—5 in Figure 1A, Figure 6 is a transverse, vertical, sectional view taken along line 6—6 in Figure 5, and Figure 7 is a vertical, sectional detail view taken along line 7—7 in Figure 3.

Referring more specifically to the drawings, the numeral 10 denotes a suitable floor of a room having walls 11 and a ceiling 12. Mounted on floor 10 are angles 14 and 15 which form a base upon which is mounted end frames or Samsons 16 and 17 and intermediate frames or Samsons 18 and 19, 20 and 21 of an automatic spooler.

An automatic spooler is divided into a plurality of sections such as shown in the drawings between Samsons 18 and 19 or between Samsons 20 and 21. Extending from the opposite sides of each Samson are suitable brackets 25 and 26 having mounted on the ends thereof bobbin supply boxes 27 and 28, these boxes being shown in Figure 2, but omitted in Figure 1 in order to more clearly disclose the invention.

Secured to each side of the intermediate portions of the Samsons 18 and 21 are longitudinal channels 29 and 30 which serve as struts for rigidly tying the Samsons together. Rotatably mounted in the upper portion of the Samsons are cylinders 31 and 32 which rotate in the direction designated by the arrows and cause the cheeses or packages of yarn 33 and 34 to likewise rotate and draw the yarn from the bobbins 35 and 36 upwardly through combs 37 and 38 respectively, to cause the same to be wound onto the packages. A suitable trackway 39 is disposed on the upper side of Samsons 18 to 21 and the end frames 16 and 17, upon which a carriage (not shown) is adapted to travel and cause empty bobbins to be replaced by a full bobbin of yarn in the spooler.

Also disposed between each of the frames 18 to 21 is a cover plate 40 and a suspended baffle 41 pivoted as at 42. On opposite sides of each Samson are upper brackets 45 and lower brackets 46 upon which a conveyor belt 47 is adapted to travel for receiving the empty bobbins after the same have been doffed from the bobbin holders 48 and convey the bobbins to a suitable container (not shown) at the end of the spooler.

The parts thus far described are conventional in conventional spoolers, but it is deemed necessary to disclose this much of the old structure in order to more clearly describe the invention.

In order to use an induced draft to clean the machinery as disclosed in the drawings, it is necessary to install suitable baffles in various portions of the machine so that the draft may be directed through the natural openings of the machine to remove the dust, lint and fly therefrom and also to prevent the same from collecting thereon. Suitable baffles 50 and 51 have been secured between each of the Samsons or in each section of the spooler, to longitudinal struts 52 and 53 of the machine. These baffles 50 and 51 converge downwardly, forming an opening 54 through which the downward current of air passes together with the dust, lint and fly from the upper portions of the machine, and particularly the dust and fly which is created by cylinders 31 and 32 and the cheese rolls 33 and 34.

While cylinders 31 and 32 do not, in themselves, create the induction draft, it is seen that since the upper side of the rolls rotate inwardly that the induction draft created by the fan, which will be presently described, will be materially assisted in collecting the fly and lint and transferring it downwardly through the opening 54.

Secured to longitudinal channels 29 and 30 are conventional baffles 56 and 57 which extend downwardly and have the lower edges thereof secured to the sides of the frames 16ª to 21ª. These baffles will cause the draft which passes downwardly through the bobbin boxes 58 and 59 to thoroughly cleanse the interior portions of these boxes as well as the exterior of bobbins 35 and 36. A current will also be drawn downwardly through the openings which exist between the lower edges of baffle plates 56 and 57 and the conveyor belt 47.

Baffles 61 and 62 are secured to the upper edges of hopper 60, said baffles 61 and 62 having the upper edges thereof abutting the inside edges of bobbin supply boxes 27 and 28. The baffles 61, 62 are provided by the sides of a sectional horizontally disposed rectangular frame (Figure 4) which is secured at its ends to the frames 18ª, 21ª and at its sides to the frames 18ª, 19ª, 20ª and 21ª. The upper portion of the frame which provides the baffles 61, 62 is of funnel-shaped contour in transverse section (Figure 2). The hopper 60 in connection with that frame, which has its sides form the baffles 61, 62, provides an open top and a closed bottom housing located about the lower portion of the sides and ends of the spooler. The hopper 60 provides the bottom of such housing. By placing the upper edges of these plates in the position shown in Figure 2, it is seen that the dust and lint from the top of the supply boxes will also be drawn downwardly into the hopper 60. The structure described in Figure 2 is typical of the structure in each of the sections of the spooler. In other words, the structure between Samsons 20 and 21 and the other Samsons and frames of the machine, not shown, is identical to the structure between Samsons 18 and 19 and frames 18ª and 19ª; therefore, like reference characters will be given like parts and another description will not be made for the other sections.

Connected to the lower end of hoppers 60 are vertically disposed pipes 65 which lead into a horizontally disposed pipe 66, said pipe 66 increasing in size as it progresses to the right in Figure 1, since this pipe serves as a trunk line.

Pipe 66 leads to the intake opening of a suitable fan 67 which fan is connected to the lower side of the floor 10. The pipe 66 is held in position by suitable means such as hangers 68 suspended from the lower side of floor 10.

Fan 67 exhausts into a suitable duct or pipe 70 which extends upwardly through the floor 10 and leads into a filter 71 which is suspended from the ceiling 12. The filter 71 is lined with a suitable filtering material 72 such as textile fabric or wire fabric and has a suitable hinged door 73 in the lower side thereof pivoted as at 74 and having latch 75. This door may be opened when it is desired to remove the accumulated fly, dust and lint caught by the filtering material 72. The filter 71 has baffle plates 76 on the front edge thereof for directing the exhaust current of air downwardly onto the creeling apparatus which will be presently described.

A shield 77 encircles the filter 71 and causes the currents of air which pass through the filter to be directed downwardly in the direction of arrows as shown in Figures 1A and 6.

The exhaust from filter 71 is directed downwardly onto the creeling apparatus 80 and 81 and onto the surrounding floor to cause the dust and lint particles which fall onto the floor directly beneath the creels, to be blown toward the rear of the machine. The creels 80 and 81 have conventional fans 83 and 84 for blowing the particles from the strands of yarn as it is drawn from the creel to the warper thereby preventing it from collecting on the yarn.

After the particles are blown onto the floor, the exhaust air from the filter 71 blows these particles rearwardly of the creel frames to openings 85 and 86 where it is drawn by the suction produced by the fan 67 downwardly through the floor into pipes 87, 88, 89, 90 and back into pipe 66, where it is pulled through the fan 67 and forced into the filter 71. Hangers 91 are used to suspend pipes 89 and 90 from the lower side of the floor 10.

In order to cause these particles to be gathered at the openings 85 and 86, a curb 92 is provided which, in the present instance in Figure 3, resembles a rough W in its plan view. This curb (Figure 1A) extends a slight distance above the floor level in order to properly direct these particles to the openings. The creels 80 and 81 have a plurality of packages of yarn 93 thereon which are wound onto a warp beam 95 of warper 96. The strands leading from the packages 93 pass through comb 97, over roller 98 and then onto the warp beam. This warp beam is rotatably mounted in arms 99 and 100, which arms support guard rail 101.

It is well known in the art of creeling and warping that movement produced by the rotation of warp beam 95 will cause all of the strands from the packages of yarn 93 to move rapidly toward the warp beam at approximately 900 yards per minute. This swift movement of the ends will cause an induced draft to be set up which will be overcome by the exhaust draft from the filtering apparatus 71, thereby causing the fly and lint which falls upon the floor to be directed rearwardly to the openings 85 and 86 instead of toward the warper 96.

It is also desirable to cleanse the warp beam 95 during the operation of the creeling apparatus; therefore, a slotted pipe 105 has been mounted in parallel relation to the warp beam 95 and this pipe is located with its slot 106 adjacent the surface of the warp beam. This slot 106 extends approximately the length of the warp beam and collects the lint particles from the surface of the beam by virtue of the induced draft set up by the fan 67. The pipe 105 is U-shaped and has each end thereof pivotally connected as at 108 and 109 to vertically disposed ducts 110 and 111 respectively. These ducts lead downwardly through the floor 10 and are connected to vertically disposed duct 112, said duct 112 having its lower end connected to pipe 90.

It is thus seen that the lint, fly, dust and other foreign particles which are created by the rotation of the warp beam will be collected and transferred downwardly through the pipes 110, 111, 112 and 90 back into the pipe 66. From this pipe, the dust, lint and other foreign particles will be drawn through fan 67 and forced upwardly through pipe 70 into filter 71 where the air is filtered and the exhaust is used to blow the trash from the creel frames 80 and 81 into suction openings 85 and 86.

By filtering the air and using the same over and over again in the mill, the temperature and humidity of the air is not materially affected; therefore, the air can be recirculated through the room without the necessity of drawing in outside air which is very often of different temperature and humidity from that of the room.

To draw in outside air would necessitate additional expense. By using an induction draft for cleaning the machinery, the particles of dust, lint and fly are collected from the room and the air is purified or conditioned. This creates a decidedly more healthful working condition for the employees as the air is purer and more free from lint and dust than it would be if a direct cleaning machine were used, that is, cleaning machinery which does not collect any dust or lint from the machine but merely removes the lint from the machine by exposing the same to a direct blast of air.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Means for removing lint and the like from a spooler and like textile machines comprising a plurality of plates secured to the upper half of the spooler and being spaced from each other to provide slots therebetween at the points where lint is present in the greatest quantities, a pair of downwardly converging plates enclosing the lower portion of the spooler, a pipe having communication at spaced intervals with the lower portions of said converging plates, a combined suction and blower fan disposed in said pipe for creating a partial vacuum within said spooler to draw lint from said slots and the adjacent portions of the spooler, a filter disposed within the same room as the spooler and having the other end of said pipe connected thereto whereby the air withdrawn from a room through the spooler is filtered and returned to the same room.

2. Means for removing lint and the like from a spooler and like textile machines comprising a plurality of plates secured to the upper half of the spooler and being spaced from each other to provide slots therebetween at the points where lint is present in the greatest quantities, a pair of downwardly converging plates enclosing the lower portion of the spooler, a pipe having communication at spaced intervals with the lower portions of said converging plates, a combined suction and blower fan disposed in said pipe for creating a partial vacuum within said spooler to draw lint from said slots and the adjacent portions of the spooler, a filter disposed within the same room as the spooler and having the other end of said pipe connected thereto, a creel, means for directing the air from the filter downwardly onto the creel, a plurality of fans disposed on the creel for assisting the drafts of air from the filter in blowing the lint from the packages of yarn on the creel to the floor, means for directing the lint below the creel to a point on the floor below the creel, and a return pipe communicating with the space below the creel and having its other end in communication with the suction side of said fan.

3. Means for cleaning textile machinery which comprises a plurality of plates secured to the machinery to enclose the same and also to provide slots between the edges of the plates disposed at the lint collecting points on the machinery, a plurality of enclosures entirely closing the bottom of the machinery, a plurality of pipes having one end secured to the said enclosures and communicating with the interior of the machine, a master pipe to which the other ends of said pipes are secured, a combined suction and blower fan having the master pipe communicating with the suction side thereof, a discharge pipe having one end secured to the blower side of said fan, a filter located in the same building as the machinery and having one side thereof communicating with the other end of said discharge pipe, whereby the air in a building is drawn through the machinery and filtered and used again.

4. Means for cleaning textile machinery which comprises a plurality of plates secured to the machinery to enclose the same and also to provide slots between the edges of the plates disposed at the lint collecting points on the machinery, a plurality of enclosures entirely closing the bottom of the machinery, a plurality of pipes having one end secured to the said enclosures and communicating with the interior of the machine, a master pipe to which the other ends of said pipes are secured, a combined suction and blower fan having the master pipe communicating with the suction side thereof, a discharge pipe having one end secured to the blower side of said fan, a filter located in the same building as the machinery and having one side thereof communicating with the other end of said discharge pipe, a second textile machine, means connected to the discharge side of the filter for directing the filtered air, along with other air in the building onto the second textile machine, a return pipe having one end communicating with the upper side of the floor disposed beneath the second textile machine and having its other end secured to the intake or suction side of said fan, and baffle members secured to the floor and at least partially surrounding said second machine for directing the lint blown from said second machine into the open end of the return pipe.

5. In combination, a textile machine, a second textile machine, a filter, plates enclosing portions of the first machine to provide slots between the plates enclosing the first machine, a pipe having one end in communication with the interior of said machine enclosed by said plates, a combined suction and blower fan having its suction side connected to the other end of said pipe, a second pipe having one end connected to the blower side of said fan and having its other end connected to one side of said filter, means associated with the other side of said filter for directing the filtered air onto the second machine, a third pipe having one end disposed beneath the second machine and having its other end connected to the suction side of said fan, whereby the air after being filtered is discharged onto the second machine and is again, with other air, forced by said fan onto the second machine.

6. In combination a spooler, a creel, and a warper having a warp beam onto which yarn is wound from the packages in the creel, plates enclosing the top and sides and bottom of the spooler to provide slots at points where lint is accustomed to collect in substantial quantities, a combined suction and exhaust fan, a slotted pipe pivotally mounted on the warper and extending longitudinally of and exteriorly of the warp beam and having its slot disposed adjacent the periphery of the warp on the warp beam, a piped connection between said slotted pipe and the suction side of said fan, other pipes connecting the inside of the spooler with the suction side of said fan, baffle plates secured to the floor supporting the creel and surrounding three sides of the creel and extending a few inches above the floor, a filter having a piped connection with the exhaust side of said fan, means for directing the air after it passes through said filter downwardly onto said creel to blow the lint from the packages and yarn in the creel onto the floor beneath the creel and a piped connection between the suction side of said fan and the upper surface of the floor beneath the creel, all of said apparatus cooperating to remove lint from the warper, the spooler and the creel and for again directing the filtered air onto said creel.

7. A means for removing the lint and fly from a textile machine comprising means enclosing the parts of the machine capable of generating lint and fly, a duct connected to said first means, suction means connected to said duct, a discharge member connected to said duct for returning the air to the machine from above said first means, and downwardly inclined plates carried by said discharge member.

ERNEST J. EADDY.